United States Patent
Boven et al.

(10) Patent No.: US 12,552,892 B2
(45) Date of Patent: Feb. 17, 2026

(54) GRAFTING PROCESS OF A DIELS ALDER ADDUCT ONTO POLYPROPYLENE

(71) Applicant: SABIC GLOBAL TECHNOLOGIES B.V., Bergen op Zoom (NL)

(72) Inventors: Gert Boven, Steenbergen (NL); Francesco Picchioni, Groningen (NL); Klaas Remerie, Maastricht (NL); Chandrashekhar Lingannaiah, Bangalore (IN); Senthil Kumar Minor, Chennai (IN); Jerome Vachon, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 486 days.

(21) Appl. No.: 18/035,604

(22) PCT Filed: Jul. 15, 2021

(86) PCT No.: PCT/EP2021/069789
§ 371 (c)(1),
(2) Date: May 5, 2023

(87) PCT Pub. No.: WO2022/096164
PCT Pub. Date: May 12, 2022

(65) Prior Publication Data
US 2023/0399448 A1    Dec. 14, 2023

(30) Foreign Application Priority Data
Nov. 6, 2020   (EP) .................................... 20206322

(51) Int. Cl.
*C08F 255/02*   (2006.01)
*C08J 5/18*   (2006.01)
*C09J 151/06*   (2006.01)

(52) U.S. Cl.
CPC .............. *C08F 255/02* (2013.01); *C08J 5/18* (2013.01); *C09J 151/06* (2013.01); *C08J 2351/06* (2013.01)

(58) Field of Classification Search
CPC .... C08F 222/04; C08F 232/04; C08F 255/02; C08F 8/00
See application file for complete search history.

(56) References Cited

U.S. PATENT DOCUMENTS 3,873,643 A    3/1975  Wu et al.
4,739,017 A *  4/1988  Tabor .................... C08F 287/00
                                                   525/289

FOREIGN PATENT DOCUMENTS

EP    0327745 A1    8/1989

OTHER PUBLICATIONS

Coiai S, et al. "Control of Degradation Reactions During Rad! Cal Functionalization of Polypropylene in the Melt", Macromolecules, American Chemical Society, vol. 37, No. 22, Nov. 2, 2004, pp. 8414-8423.

(Continued)

*Primary Examiner* — Mark S Kaucher
(74) *Attorney, Agent, or Firm* — CANTOR COLBURN LLP (57) ABSTRACT

The present invention relates to maleic acid derivatives polar group-containing polypropylene, the process to making the same by reactive extrusion in presence of a grafting agent, a polypropylene co- and/or homopolymer is put in contact with a Diels-Alder adduct which is the reaction product of a diene and a dienophile belonging to the group of maleic acid derivatives.

14 Claims, 5 Drawing Sheets

(56) References Cited

OTHER PUBLICATIONS

International Search Report for International Application No. PCT/EP2021/069789, International Filing Date Jul. 15, 2021, Date of Mailing Sep. 15, 2021, 4 pages.
Moad, G. "The synthesis of polyolefin graft copolymers by reactive extrusion", Progress in Polymer Science 24 (1999) 81-142.
Passaglia, E. et al., "Control of macromolecular architecture during the reactive functionalization in the melt of olefin polymers", Progress Polymer Science 34 (2011) 911-947.
Passaglia, E. et al., "Some recent advances in polyolefin functionalization" Polym. Int.: 63, (2014), 12-21.
Written Opinion for International Application No. PCT/EP2021/069789, International Filing Date Jul. 15, 2021, Date of Mailing Sep. 15, 2021, 5 pages.

* cited by examiner

GRAFTING PROCESS OF A DIELS ALDER ADDUCT ONTO POLYPROPYLENE

CROSS REFERENCE TO RELATED APPLICATIONS

This application is a National Stage application of PCT/EP2021/069789, filed Jul. 15, 2021, which claims the benefit of European Application No. 20206322.8, filed Nov. 6, 2020, both of which are incorporated by reference in their entirety herein.

TECHNICAL FIELD OF THE INVENTION

The present invention relates to a process to obtain a Diels-Alder adduct preferentially of maleic anhydride grafted onto an olefin and in particular onto polypropylene.

TECHNOLOGICAL BACKGROUND OF THE INVENTION

In order to improve interfacial adhesion and to allow for reactive compatibilization, polyolefins (PO) and in particular polypropylene (PP), are functionalized with polar molecules like maleic anhydride (MAH).

The conventional process to synthesize such polar functionalized olefin, in particular PP grafted with MAH (PP-g-MAH) is by post-polymerization reactive extrusion at high temperature around 160-220° C.

This process has been described by S. B. Brown, in Reactive Extrusion, New York, 1992 and uses a radical initiator in order to graft the polar functionalized group on the PO.

However, radical initiated grafting of polar functionalized group onto polypropylene suffers from chain scission and relative low grafting yields. This phenomenon is well described in literature, e.g. by Elisa Passaglia et al. in Progress Polymer Science 34 (2011) 911-947 and by G. Moad in Progress in Polymer Science 24 (1999) 81-142. It can also be deduced from the commercially available PP-g-MAH materials, all of them are high flow and have low MAH content.

It is know that EP0327745 discloses a process to graft Diels Alder adducts of very volatile compounds onto polyethylene (PE). However, the success rate of grafting such Diels-Alder adduct is low and it is commonly known that the radical process of grafting reactions creates crosslinking of PE, and chain degradation of PP.

It is known that U.S. Pat. No. 3,873,643 discloses a process to graft cyclic acids and acid anhydrides on PE. However it did not prevent the side reaction of PE, i.e. increase of viscosity.

Therefore, there is a need for a process to produce polar functionalized polyolefins which overcomes at least one of this drawbacks.

SUMMARY

This object is achieved by the present invention by a polar group-containing polypropylene having:
  Melt flow index (MFI) less than 10
  grafted polar group content between 0.3 and 5 wt %
  wherein the polar group is a maleic acid derivative
  and wherein the polar group-containing polypropylene comprising at least a constituent unit represented by the following formula (1), a constituent unit represented by the following formula (2)

and
Optionally a constituent unit represented by the following formula (3)

Wherein
  X is selected in the group comprising $CH_2$, O, S, NH
  When X is $CH_2$, R is selected in the group comprising a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or R is selected in the group comprising an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

When X is O, S or NH, R is selected in the group comprising hydrogen or a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or R is selected in the group comprising an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

R' is selected in the group comprising hydrogen or a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

Y is selected in the group comprising O, S and NR" when R" is selected in the group comprising hydrogen, a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or R" is selected in the group comprising hydrogen, an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

In an embodiment, Y and X are O, R' is hydrogen and R is —$CH_2COOR'''$ wherein R''' is selected in the group comprising hydrogen, alkyl from $C_1$ to $C_{13}$ which may include functional groups selected from the list including alcohols, thiols, ketones, aldehydes, ethers, carboxylic acids, carboxylic acid anhydrides, esters, amines, amides, or an aromatic moiety with $C_5$ to $C_{15}$ which may include functional groups selected from the list including alcohols, thiols, ketones, aldehydes, ethers, carboxylic acids, carboxylic acid anhydrides, esters, amines and amides, R''' is preferably —$CH_2CH_3$.

A second aspect of the invention is a process for preparing polar group-containing polypropylene wherein, the polar group is a maleic acid derivative grafted by reactive extrusion, in presence of a radical forming grafting agent like an azo-compound or a peroxide, preferably a proton abstracting peroxide, more preferably a proton abstracting peroxide with a half-life time of 6 seconds or less at 175° C., most preferably dilauroyl peroxide (DLP), in which a polypropylene co- and/or homopolymer is put in contact with a Diels-Alder adduct which is the reaction product of a diene and a dienophile belonging to the group of maleic acid derivatives: maleic anhydrides, maleic imides or maleic thioanhydrides according to the Formula (4)

Wherein

X is selected in the group comprising $CH_2$, O, S, NH

When X is $CH_2$, R is selected in the group comprising a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or R is selected in the group comprising an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

When X is O, S or NH, R is selected in the group comprising hydrogen or a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or R is selected in the group comprising an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

R' is selected in the group comprising hydrogen or a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

Y is selected in the group comprising O, S and NR" when R" is selected in the group comprising hydrogen, a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or R" is selected in the group comprising hydrogen, an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

In an embodiment, the grafting yield [%] of the maleic anhydride is between 25 and 65 and the retention Mw of the polypropylene co- and/or homopolymer is between 50 and 99.7%.

In an embodiment, the maleic acid derivatives is maleic anhydride (MAH).

In an embodiment, the Diels-Alder adduct is Ethyl-3-(1,3-Dioxo-3,3a,7,7a-tetrahydro,4,7-epoxyisobenzofuran-4 (1H)-yl)proponoate (MAHEFYP) or 5-Norbornene-2,3-dicarboxylic anhydride (MAHCP).

In an embodiment, the Maleic acid derivatives concentration equivalent is between 0.3 to 10 wt %, preferably 0.4 to 7 wt %, more preferably 0.5 to 6 wt %, advantageously 1 to 6 wt %.

In an embodiment, grafting is performed under continuous process, preferably with a twin screw extruder.

A third aspect of the invention is a thermoplastic resin composition containing the polar group-containing olefin polypropylene according to the invention or obtained by a process according to the invention.

A fourth aspect of the invention is an adhesive resin, a compatibilizer, a precursor of compatibilizer suitable to be reacted with a hydroxyl or amino terminated polymer or oligomer, a resin modifier, an adhesive resin, a filler dispersant, a film or a sheet comprising the polar group-containing olefin polypropylene according to the invention or the thermoplastic resin according to the invention.

Surprisingly applicant found that by making a Diels-Alder adduct (DA) of maleic acid derivatives, (in particular maleic anhydride) with a diene and grafting this onto polypropylene, degradation of polypropylene is suppressed and maleic acid derivatives graft yield is improved over that of grafting pure maleic acid derivatives.

It is especially surprising because it is known that the Diels-Alder reaction is reversed at high temperatures like typically used in reactive extrusion, recreating the diene and dienophile building blocks. Therefore the results of these grafting reactions were expected to be similar to those of grafting pure MAH.

DETAILED DESCRIPTION

Surprisingly applicant found that by making a Diels-Alder adduct (DA) of maleic acid derivatives with a diene and grafting the DA by radical initiated grafting process onto polypropylene (PP), the degradation of PP is almost fully suppressed and maleic acid derivatives graft yield is generally improved over graft yield of pure maleic acid derivatives following the same process.

Polypropylenes

In this application, polypropylene (PP) means a homopolymer of propylene or a mixture of propylene and at least another olefin ranging from $C_2$ or $C_4$ to $C_{20}$ such as ethylene, 1-butene, 3-methyl-1-butene, 1-pentene, 4-methyl-1-pentene, 1-hexene, vinyl cyclohexane, 1-octene, norbornene, vinylidene-norbornene, ethylidene-norbornene, such as a propylene-based copolymer, e.g. heterophasic propylene-olefin copolymer; random propylene-olefin copolymer.

Advantageously, the mixture of propylene and at least another olefin comprises at least 50 wt % of propylene the rest is another olefin ranging from $C_2$ or $C_4$ to $C_{20}$, preferably ethylene, 1-butene, 3-methyl-1-butene, 1-pentene, 4-methyl-1-pentene, 1-hexene, vinyl cyclohexane, 1-octene, norbornene, vinylidene-norbornene, ethylidene-norbornene, preferably at least 60 wt. %, more preferably at least >70 wt. %, most preferably at least 80 wt. %, advantageously 90 wt %, more advantageously 99.7 wt %.

In some embodiment, PP can be a heterophasic propylene copolymer wherein the heterophasic propylene copolymer consists of:
(a) a propylene-based matrix, wherein the propylene-based matrix consists of a propylene homopolymer and/or a propylene copolymer consisting of at least 70 wt % of propylene and at most 30 wt % of ethylene and/or an α-olefin having 4-10 carbon atoms, based on the total weight of the propylene-based matrix and wherein the propylene-based matrix is present in an amount of 60 to 95 wt % based on the total heterophasic propylene copolymer and
(b) a dispersed ethylene-α-olefin copolymer, wherein the dispersed ethylene-α-olefin copolymer is an ethylene-propylene copolymer, wherein the ethylene-α olefin copolymer is present in an amount of 40 to 5 wt % based on the total heterophasic propylene copolymer and wherein the sum of the total amount of propylene-based matrix and total amount of dispersed ethylene-α-olefin copolymer is 100 wt %.

In some embodiment, PP can be a terpolymer meaning that it is a copolymer of three different olefin monomers comprising propylene and 2 other different olefins ranging from $C_2$ or $C_4$ to $C_{20}$, preferably ethylene, 1-butene, 3-methyl-1-butene, 1-pentene, 4-methyl-1-pentene, 1-hexene, vinyl cyclohexane, 1-octene, norbornene, vinylidene-norbornene, ethylidene-norbornene. In this embodiment the content of propylene is superior to the content of each of the other olefins separately, preferentially the amount of PP is superior to 70 wt %, preferentially 80 wt %, more preferentially 90 wt % based on the total terpolymer.

In some embodiment the PP may also contain one or more of usual additives, including stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; impact modifiers; blowing agents; fillers and reinforcing agents; and/or components that enhance interfacial bonding between PP and filler.

Maleic Acid Derivatives (Dienophiles)

In this application, a maleic acid derivative means a compound according to formula (5)

(5)

In which Y is selected in the group comprising O, S and NR" when R" selected in the group comprising hydrogen, a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or R" is selected in the group comprising hydrogen, an aromatic moiety with $C_5$ to $C_{15}$ which may include functional groups selected from the list including alcohols, thiols, ketones, aldehydes, ethers, carboxylic acids, carboxylic acid anhydrides, esters, amines and amides Dienes In this application, diene means a compound according to formula (6)

(6)

in which X is selected in the group comprising $CH_2$, O, S, NH,

When X is $CH_2$, R is selected in the group comprising a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or R is selected in the group comprising an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

When X is O, S or NH, R is selected in the group comprising hydrogen or a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or R is selected in the group comprising an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

R' is selected in the group comprising hydrogen or a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

Diels-Alder adducts (DA)

In this application, Diels-Alder adduct (DA) means a compound resulting from the reaction between a diene and maleic acid derivative according to the formula (4)

(4)

In which Y is selected in the group comprising O, S and NR" when R" is selected in the group comprising hydrogen, a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or R" is selected in the group comprising hydrogen, an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

in which X is selected in the group comprising $CH_2$, O, S, NH,

When X is $CH_2$, R is selected in the group comprising a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or R is selected in the group comprising an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

When X is O, S or NH, R is selected in the group comprising hydrogen or a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or R is selected in the group comprising an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

R' is selected in the group comprising hydrogen or a saturated aliphatic group with $C_1$ to $C_{15}$ which may include functional groups selected from the list including alcohols, thiols, ketones, aldehydes, ethers, carboxylic acids, carboxylic acid anhydrides, esters, amines, amides or an aromatic moiety with $C_5$ to $C_{15}$ which may include functional groups selected from the list including alcohols, thiols, ketones, aldehydes, ethers, carboxylic acids, carboxylic acid anhydrides, esters, amines and amides.

In an embodiment, the preferred Diels-Alder Adducts suitable for the invention do substantially decompose strictly below 120° C., preferably below 115° C., more preferably below 110° C., preferably strictly below 100° C., into a diene and maleic acid derivative.

Radical Initiated Grafting Process

This is a process in which radicals are created by decomposition of a radical forming agent, these radicals react directly or indirectly with polypropylene, abstracting a hydrogen radical from the polypropylene, creating a carbon-centered radical on the polypropylene chain. This so called macroradical reacts with the moiety to be grafted and forms a carbon-carbon covalent bond with this moiety.

The radical initiated grafting process of this invention is melt process in which maleic acid derivatives are grafted onto polypropylene. The process can be executed in batch kneaders as they are known in the art, e.g. a Brabender Plasticorder or a Haake Polylab kneader. The process can also be executed in continuous reactors like, but not limited to, extruders, preferable twin screw extruders, like a Coperion Model ZSK-25 or many other models from many other suppliers. The radical initiator and the maleic acid derivative can be added to polypropylene before or after melting. The mixture is processed in the melt and quenched by taking it out of the reactor and cooling in air or in a coolant like water. Other additives to stabilize polypropylene can be present, they can be added to the polypropylene before, during or after the radical initiated grafting process.

Radical Forming Agent

In this application, a radical forming agent means any compound having the capability to graft maleic acid derivative onto PP by a radical process, meaning that a radical reacts directly or indirectly with polypropylene, abstracting a hydrogen radical from the polypropylene, creating a carbon-centered radical on the polypropylene chain.

The radical forming agent can be selected from the list comprising: an azo-compound, a peroxide or another radical forming agent know in the art.

The radical forming agent can be chosen from a list of azo-compounds like 2,2'-Azobis(isobutyronitrile), 2,2'-Azobis(2,4-dimethylvaleronitrile), 2,2'-Azobis (2-methylbutyronitrile), 1,1'-Azobis(cyclohexane-1-carbonitrile), 4,4'-Azobis(4-cyanovaleric acid), Dimethyl 2,2'-azobis(2-methylpropionate), 2,2'-Azobis[2-methyl-N-(2-hydroxyethyl)propionamide], 2,2'-Azobis (N-butyl-2-methylpropionamide), from a list of peroxides like di(4-tert-butylcyclohexyl) peroxydicarbonate, dicetyl peroxydicarbonate, dimyristyl peroxydicarbonate, di(3,5,5-trimethylhexanoyl)peroxide, t-butyl peroxypivalate, didecanoyl peroxide, dilauroylperoxide, tert-Butyl peroxy-2-ethylhexanoate, di-benzoylperoxide, Butyl 4,4-di(tert-butylperoxy) valerate, 1,1-Di(tert-butylperoxy)-3,3,5-trimethylcyclohexane, tert-Butylperoxy isopropyl carbonate, t-butyl peroxy-3,5,5-trimethylhexanoate, t-butylperoxybenzoate, dicumylperoxide, 2,5-Dimethyl-2,5-di(tert-butylperoxy) hexane, di(tert-butylperoxyisopropyl) benzene, t-butyl-cumyl-peroxide, di-t-butylperoxide, 2,5-Dimethyl-2,5-di(tert-butylperoxy) hexyne-3,3,6,9-Triethyl-3,6,9-trimethyl-1,4,7-triperoxonane, 3,3,5,7,7-pentamethylene-1,2,4-trioxepane, diisobutyryl peroxide cumyl peroxyneodecanoate, di(3-methoxybutyl)peroxydicarbonate, 1,1,3,3-tetramethylbutyl peroxyneodecanoate, tert-amyl peroxyneoheptanoate, cumyl peroxyneoheptanoate, di(4-sec-butylcyclohexyl) peroxydicarbonate, di(2-ethylhexyl) peroxydicarbonate, tert-butyl peroxyneodecanoate, dibutyl peroxydicarbonate, 1,1,3,3-tetramethylbutyl peroxypivalate, tert-butyl peroxyneoheptanoate, 2,5-dimethyl-2,5-di(2-ethylhexanoylperoxy)hexane, 1,1,3,3-tetramethylbutyl peroxy-2-ethylhexanoate, tert-amyl peroxy-2-ethylhexanoate, tert-butyl peroxydiethylacetate, tert-butyl peroxyisobutyrate, 1,1-di(tert-amylperoxy)cyclohexane, 1,1-di(tert-butylperoxy)cyclohexane, tert-amylperoxyacetate, 2,2-di(tert-butylperoxy)butane, tert-butylperoxy-2-ethylhexyl carbonate, tert-butyl peroyacetate, isopropylcumyl hydroperoxide, tetramethylbutyl hydroperoxide, tert-butylhydroperoxide, tert-amylhydroperoxide and radical forming agents not being azo compounds or peroxides like 2,3-dimethyl-2,3-diphenylbutane This radical forming agent is preferably a hydrogen abstracting species, more preferably a hydrogen abstracting species with a half-life time of 6 seconds or less at 175° C.

The reactivity of the peroxides is calculated using the Arrhenius equation shown in formula 1.

Formula 1, Arrhenius equation:

$$k_d = A * e^{-Ea/RT}$$

In which $k_d$ is the rate constant for initiator decomposition in $s^{-1}$
is the Arrhenius frequency factor in $s^{-1}$
$E_a$ is the activation energy for initiator decomposition in J/mol
R is 8.3142 J/mol/K
T is temperature in K
A and $E_a$ data are provided by suppliers The half-life time can be calculated using formula 2

Formula 2, half-life time:

$$t_{1/2} = \ln 2/k_d$$

In which:
$t_{1,2}$ is the half-life time in seconds
$k_d$ is the rate constant for initiator decomposition in $s^{-1}$ In a preferred embodiment the radical forming agent follows the formula 3 at 175° C.:

$$\ln 2/(A * e^{-Ea/RT}) \leq 6 \qquad \text{Formula 3:}$$

The preferred initiators are di(3-methoxybutyl)peroxydicarbonate, di(4-tert-butylcyclohexyl) peroxydicarbonate, 1,1,3,3-tetramethylbutyl peroxyneodecanoate, dibutyl peroxydicarbonate dicetyl peroxydicarbonate, di(2-ethylhexyl)peroxydicarbonate, dimyristyl peroxydicarbonate cumyl peroxyneoheptanoate, tert-amyl peroxyneoheptanoate, 1,1,3,3-tetramethylbutyl peroxy-2-ethylhexanoate, tert-butyl peroxyneodecanoate, tert-butyl peroxyneoheptanoate, di(3,5,5-trimethylhexanoyl)peroxide, t-butyl peroxypivalate, 4,4'-azobis(4-cyanopentanoic acid), didecanoyl peroxide, 1,1'-Azobis(cyclohexane-1-carbonitrile), dilauroylperoxide, 2,5-dimethyl-2,5-di(2-ethylhexanoylperoxy) hexane, tert-amyl peroxy-2-ethylhexanoate, tert-butyl peroxydiethylacetate, 2,2'-Azobisisobutyronitrile, tert-Butyl peroxy-2-ethylhexanoate, di-benzoylperoxide tert-butyl peroxyisobutyrate, 1,1,3,3-tetramethylbutyl peroxypivalate, 1,1-di(tert-amylperoxy)cyclohexane, butyl 4,4-di(tert-butylperoxy) valerate and tert-amylperoxyacetate, most preferably dilauroylperoxide (DLP), It is known that Diels Alder adducts undergo reverse Diels Alder reactions at high temperatures, thus forming the diene and dienophile constituents. At extrusion temperature the DA adduct of MAHEFYP is reversed into its single constituents: MAH and EFYP.

Therefore, it could be assumed that only the maleic acid derivatives will be grafted and not the dienes as it does not have a reactive double bond.

However, surprisingly, after the grafting process of the DA onto PP according to the invention, those constituents of the DA adduct can be found grafted on the PP when measured by infrared spectrophotometry, in particular:

a first constituent unit represented by the following formula (1), a second constituent unit represented by the following formula (2)

and potentially a third constituent unit represented by the following formula (3)

(3)

It could also be assumed that degradation of PP would be the same or very similar to that in the grafting process of pure MAH.

However, surprisingly degradation of PP was reduced using DA adducts compared to using pure MAH.

EXAMPLES

The examples have been made under two kind of Post-polymerization reactive extrusion processes:
A batch process with kneader (Brabender Plasticorder)
A continues process with tween screw extruder (Coperion Model ZSK-25).

Analysis:

Grafting yield was determined by transmission infrared. IR spectroscopy was done with two different methods:

The samples made by the batch process were analyzed with FTIR transmission microscopy. The powdered samples were dried at 170° C. for 1 hour at high vacuum to ensure the anhydride ring was closed, the powders were crushed at room temperature with 10 ton force to thin films. The films were analyzed on a silicon wafer with a Spotlight 400 Perkin Elmer FTIR spectrophotometer and microscope with a spectral resolution of 4 $cm^{-1}$, a measured area 100 micron (aperture) in transmission mode. The scan range was 4000-600 $cm^{-1}$ and 32 spectra per sample were recorded. The spectra were zero-ed at 1900 $cm^{-1}$, normalized at 4060 $cm^{-1}$ and the height of the peak at 1780 $cm^{-1}$ was taken as the measurement for grafted MAH.

The samples made in the continuous extrusion process were analyzed by FTIR transmission spectroscopy. A thin film of the sample was prepared by melting and pressing the sample that was previously dried at 170° C. at high vacuum for at least one hour. The FTIR spectrum was measured on a Perkin Elmer Frontier FTIR Spectrophotometer in transmission mode. Background and sample scans were taken from 4000 $cm^{-1}$ to 500 $cm^{-1}$ at a scan resolution of 4 $cm^{-1}$ and an average of 32 scans. MAH level was determined zeroing the spectra at 1900 $cm^{-1}$ and normalizing at 2722 $cm^{-1}$, which correspond to a typical C—H vibration. The height of the peak at 1780 $cm^{-1}$ was measured over a baseline from 1750 to 1820 $cm^{-1}$.

For both FTIR techniques, calibration was done by measuring polypropylene/styrene-maleic anhydride copolymers with known compositions.

Molecular weight was determined by high temperature Size Exclusion Chromatography (HT-SEC). Measurements were performed at 150° C. on a Polymer Char GPC-IR® built around an Agilent GC oven model 7890, equipped with an auto-sampler and the Integrated Detector IR4. 1,2-dichlorobenzene (o-DCB) was used as an eluent at a flow rate of 1 mL/min. The data were processed using Calculations Software GPC One®. The molecular weights were calculated with respect polystyrene standards.

Retention Mw [%] is simply the Mw of the grafted sample divided by the Mw of the starting PP. Retention Mn [%] is simply the Mn of the grafted sample divided by the Mn of the starting PP.

MFI (Melt Flow Index) was determined according ISO1133 at 230° C. and 2.16 kg weight. The results were expressed in grams per 10 minutes.

NMR spectroscopy: 1H-NMR were recorded on 400 MHz at a temperature of 120° C. using the solvent 1,1,2,2-tetrachloroethane-$d_2$.

Materials:
Isotactic polypropylene supplied by SABIC was used for all experiments.
3 type of Isotactic polypropylene were used, with different molecular weights (shown in the tables).
Maleic anhydride (MAH, 99%), ethyl 3-(furan-2-yl)propionate (EFYP; >98%), dicumyl peroxide (DCP 98%), dilauroyl peroxide (DLP), and 5-Norbornene-2,3-dicarboxylic anhydride (MAHCP, 99%) were supplied by Sigma Aldrich and used without further purification.

Synthesis of the Diels-Alder Product of MAH and EFYP: Ethyl-3-(1,3-Dioxo-3,3a,7,7a-tetrahydro,4,7-epoxyisobenzofuran-4(1H)-yl)proponoate (MA-HEFYP)

34.32 g MAH was dissolved in 270 ml diethyl ether at 60° C. After the MAH was fully dissolved, 58.87 g EFYP in 30 ml of diethyl ether was added dropwise to the solution for about 10 mins and the resultant mixture was then stirred at 60° C. (bath temperature) for 10 h (36° C., reaction mixture temperature). After addition of EFYP, white product deposits to the walls of the flask as the reaction progress. After 10 h at 60° C., reaction mixture was cooled, filtered and washed with diethyl ether (100 mL). The solid thus obtained was dried in vacuum oven at 65° C. for 2 h (Yield=63 g; 69%). Further the filtrate was concentrated under reduced pressure to give the crude product 27 g, which was then stirred with 100 ml of ether for about 15 mins and the resultant solid was filtered and washed with 100 ml of ether (Yield=22 g; 24%).

A second preferred route was investigated using tetrahydrofuran (THF) instead of diethyl ether. 34.32 g MAH was dissolved in 80 ml THF and the resultant solution was heated to 60° C. After the MAH was fully dissolved, 58.87 g EFYP in 20 ml of THF was added dropwise to the solution for about 10 mins and the resultant mixture was then stirred at 60° C. (bath temperature) for 10 h (58° C., reaction mixture temperature). After 10 h at 60° C., reaction mixture was cooled and 100 ml of hexane was added. The solid thus obtained was filtered and washed with 100 ml of hexane followed by 2 washes with 120 mL of a hexane/diethyl ether mixture in a 5:1 ratio). The solid thus obtained was dried in vacuum oven at 65° C. for 2 h (Yield=50 g; 53%).

Further the filtrate was concentrated under reduced pressure to give the crude product 37 g, which was then stirred with 100 ml of ether for about 15 mins and the resultant solid was filtered and washed with 100 ml of ether (Yield=32 g; 34%).

Reversibility of Diels-Alder Product of MAH and EFYP (MAHEFYP)

Figure 1:
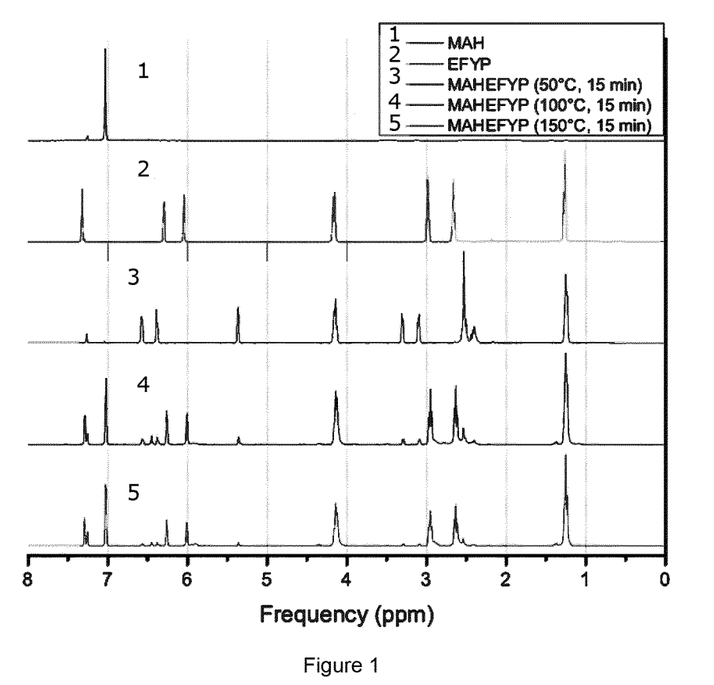
FIG. 1 illustrates NMR spectra of MAH, EFYP, MAHEFYP Diels Alder adduct as it was synthesized and after heating.

One gram of Diels-Alder product was heated at 50° C., 100° C. and 150° C. with no stirring for 15 minutes. After 15 minutes $^1$H-NMR were recorded on 400 MHz at a temperature of 120° C. using the solvent 1,1,2,2-tetrachloroethane-$d_2$. The acquisition time and relaxation time were set at 1 second and 8 seconds respectively. The $^1$H-NMR spectra were made as quickly as possible to prevent reacting of the compounds back to the Diels-Alder product. The spectra of MAH, EFYP and product after heating are shown in FIG. 1. From this figure it can be seen that the retro-Diels-Alder reaction didn't occur at 50° C. as the spectrum shows the absence of peaks that can be assigned to the furan ring (7.4 ppm) and maleic anhydride ring (7.0 ppm). However, after heating at 100° C. the product converted mostly into MAH and EFYP, and only a little DA adduct can be seen and 150° C. the product being almost completely reversed to MAH and EFYP (integration shown less than 5% DA adduct).

Post-Polymerization Reactive Extrusion Process 2 different post-polymerization reactive extrusion processes has been used:
- A batch process with kneader (Brabender Plasticorder)
- A continues process with tween screw extruder (Coperion Model ZSK-25).

Batch Process

A Brabender Plasticorder kneader was flushed with nitrogen air, filled with polypropylene reactor powder which was melted at 170° C. and 50 rpm. Secondly the functionalizing monomer (MAH, MAHEFYP, MAH+EFYP blend or MAHCP) was slowly added. Finally, dicumyl peroxide (DCP) was added and the mixture was kneaded for 15 minutes at 170° C. and 50 rpm. All the time nitrogen air was flushed over the inlet of the kneader. For all experiments 0.12 wt % DCP was used as initiator. All the samples were extracted in a Soxtec® apparatus using acetone at a temperature of 160° C. for 7 hours. Additionally, the MAH+EFYP blend samples were extracted using tetrahydrofuran (THF) at a temperature of 170° C. for 7 hours. The samples were then dried in a vacuum oven at 80° C. to remove any remaining impurities and to remove water that is obtained by ring closure of the acid groups into an anhydride group.

For the experiments with MAH, MAHEFYP, MAH+EFYP, PP was used with Mn=28500 g/mol and Mw=167300 g/mol. For the experiments with CP the PP had an Mn of 21900 g/mol and an Mw of 117600 g/mol.

This process has been use on the following example: CE1 to CE9, and EX1 to EX3.

Continues Process

Polypropylene used in these experiments was SABIC PP500P with an MVR of 5.6 g/10 min and number average molecular weight (Mn) and weight average molecular weight (Mw) of 78495 and 302749 g/mol respectively. The PP was cryogenically ground to a fine powder in which the reactive ingredients were mixed. This mixture composed 50% by weight of the feed, the rest was PP500P granulate.

The peroxide used in these experiments was dilauroyl peroxide.

Powdered PP, peroxide and reactant (MAH or MAHEFYP or MAH+EFYP or MAHCP) were weighed into a polythene bag, using a digital weighing balance. All the ingredients were thoroughly mixed in the bag.

The mixed formulation was then fed by means of a loss and weight feeder, together with PP granulated from another loss and weight feeder to an intermeshing, twin screw extruder of Coperion make (Model ZSK-25). The Screw was of 25 mm in diameter, L/D ratio of 40 and the screw revolution was maintained at 250 RPM and throughput was at 8.3 kg/h.

Vacuum was not applied to prevent evaporation of volatile components like MAH, MAHEFYP or MAHCP.

The screw configuration was designed is such a way that melting of polymer starts between zone-2 & zone-3 to facilitate thorough mixing of ingredients in the remaining seven zones (approx. 70% of extruder length) and also to enable grafting reaction.

Figure 3:
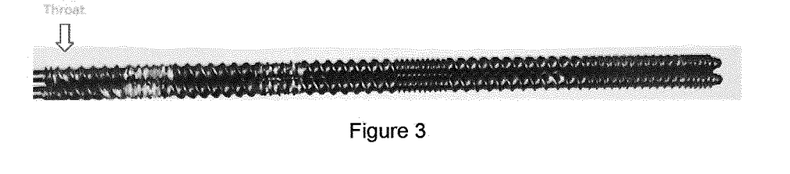
FIG. 3 illustrates the screw configuration in the continuous process used in examples

A picture of the screw configuration used is shown in FIG. 3. One of the following temperature profiles were used, both are shown in Table 1.

TABLE 1

Temperature profiles reactive extrusion experiments, temperatures in ° C.

| Profile name | Feed | Zone 1 | Zone 2 | Zone 3 | Zone 4 | Zone 5 | Zone 6 | Zone 7 | Zone 8 | Zone 9 | Zone 10 |
|---|---|---|---|---|---|---|---|---|---|---|---|
| 190 | 30 | 105 | 160 | 180 | 180 | 185 | 185 | 190 | 190 | 190 | 190 |
| 220 | 30 | 105 | 160 | 210 | 215 | 220 | 220 | 220 | 220 | 220 | 220 |

The extruded strands were cooled using a water bath and cut into cylindrical shaped pallets using an inline strand cutter. Compounded pellets were dried at 85-90° C. for about 4 hours in hot air circulated oven to remove any surface moisture present.

This process has been use on the following example: CE10 to CE20, and EX4 to EX9.

Batch Process Examples

Comparative Examples MAH: CE1, CE2, CE3 CE4

MAH was used as functionalizing monomer, its concentrations and results are shown in Table 2

TABLE 2

| CE nr | MAH conc. [wt %] | grafted MAH [wt %] | Grafting yield [%] | Mn [g/mol]* | Mw [g/mol] | Retention Mn [%] | Retention Mw [%] |
|---|---|---|---|---|---|---|---|
| PP | 0 | — | — | 28500 | 167300 | — | — |
| CE1 | 4 | 1.4 | 36 | 20500 | 64200 | 72 | 38 |
| CE2 | 5 | 1.1 | 21 | 23500 | 77200 | 82 | 46 |
| CE3 | 6 | 1.0 | 16 | 26800 | 85100 | 94 | 51 |

The results show:
- The grafting yield decreases with increasing MAH concentration.
- A clear decrease of Mn and Mw, indicating a high degree of chain scission, Mw is decreasing to 38-51% of its original value. The decrease is highest at low MAH concentrations.

Examples MAHEFYP: EX1, EX2, EX3

Diels-Alder product of MAH and EFYP (MAHEFYP) was used as functionalizing monomer, its concentrations and results are shown in Table 3. The quantities of MAHEFYP are higher so that the molar quantities of MAH are the same as those of CE 1-3, as can be seen in column MAH eq.

TABLE 3

| EX nr | MAHEFYP conc. [wt %] | MAH eq. [wt %] | grafted MAH [wt %] | Grafting yield [%] | Mn [g/mol] | Mw [g/mol] | Retention Mn [%] | Retention Mw [%] |
|---|---|---|---|---|---|---|---|---|
| PP | 0 | — | — | — | 28500 | 167300 | — | — |
| EX1 | 10.9 | 4 | 1.8 | 44 | 29800 | 126400 | 105 | 76 |
| EX2 | 13.6 | 5 | 2.5 | 49 | 31100 | 134100 | 109 | 80 |
| EX3 | 16.3 | 6 | 3.3 | 55 | 29700 | 129100 | 104 | 77 |

The results shown in Table 3 show that:

The grafting yield is higher than that of pure MAH shown in CE1 to CE3.

The grafting yield is not decreasing with increasing MAHEFYP concentrations, it even seems to increase with increasing MAH concentration.

The molecular weight is only decreasing slightly, Mn is rather stable and Mw decreases to 76 to 80% of its original value.

Comparative Examples a Blend of MAH and EFYP: CE4, CE5, CE6

A blend of MAH and EFYP was used, its concentrations and results are shown in Table 4. The quantities are such that the molar quantities of MAH and EFYP are equivalent and that the MAH concentrations are the same as those of CE 1-3 and EX 4-6, as can be seen in column MAH eq.

TABLE 4

| MAH + EFYP blend | MAH + EFYP conc. [wt %] | MAH eq. [wt %] | grafted MAH [wt %] | Grafting yield [%] | Mn [g/mol] | Mw [g/mol] | Retention Mn [%] | Retention Mw [%] |
|---|---|---|---|---|---|---|---|---|
| PP | 0 | — | — | — | 28500 | 167300 | — | — |
| CE4 | 4 + 6.9 | 4 | 1.1 | 29 | 22800 | 87600 | 80 | 52 |
| CE5 | 5 + 8.6 | 5 | 1.5 | 30 | 25300 | 92200 | 89 | 55 |
| CE6 | 6 + 10.3 | 6 | 1.5 | 26 | 27800 | 90700 | 98 | 54 |

The results shown in Table 4 show that using MAH+ EFYP blends result in:

Somewhat higher grafting yields of MAH compare to the comparative example CE1 to CE3 but lower grafting yield of MAH compare to the Example EX1 to EX3 when Diels-Alder product of MAH and EFYP (MA-HEFYP) has been used, Substantial decrease of molecular weight similar to that observed in the comparative example CE1 to CE3.

Comparative Examples 5-Norbornene-2,3-Dicarboxylic Anhydride (MAHCP): CEX7, CEX8, CEX9

5-Norbornene-2,3-dicarboxylic anhydride (MAHCP) was used as functionalizing monomer, its concentrations and results are shown in the under Table 5. The quantities of MAHCP are different so that the molar quantities of MAH are the same as those of CE 1-3 and EX 1-3, as can be seen in the column MAH eq.

TABLE 5

| EX | MAHCP conc. [wt %] | MAH eq. [wt %] | grafted MAH [wt %] | Grafting yield [%] | Mn [g/mol] | Mw [g/mol] | Retention Mn [%] | Retention Mw [%] |
|---|---|---|---|---|---|---|---|---|
| PP | — | — | — | — | 21900 | 117600 | — | — |
| CE7 | 6.7 | 4 | 1.2 | 29 | 22900 | 94400 | 105 | 80 |
| CE8 | 8.4 | 5 | 1.2 | 25 | 24900 | 96100 | 114 | 82 |
| CE9 | 10.0 | 6 | 1.6 | 26 | 29100 | 95700 | 133 | 81 |

The results shown in Table 5 show that:

The grafting yield is slightly higher that grafting pure MAH (CE1 to CE3) but lower than shown in EX 1 to EX3

The grafting yield is not decreasing with increasing MAHCP concentrations. The lowest concentration has the highest grafting yield, but the higher concentrations reactant do not show major decreases in grafting yield.

The molecular weight decreased slightly to not less than 80% of its original value, Mn is rather stable and Mw decreases slightly.

Result on Batch Process

In the batch process to graft PP with MAH the following general conclusions can be drawn:

Using Diels Alder adducts of MAH resulted in much less chain degradation than using MAH.

Grafting MAHEFYP resulted in the best combination of high grafting efficiency and low chain degradation.

Continuous Process Examples

Comparative Examples MAH: CE10 to CE15

CE10

10 grams of MAH (1 wt %, 0.1 mol), 5 grams of dilauroyl peroxide and 500 grams of powdered polypropylene (MFI=5.6 g/10 min, Mn 78495 g/mol and Mw=302749 g/mol) were mixed and fed to the extruder together with 500 grams of polypropylene granulate. This mixture was extruded at 8.3 kg/h, 250 rpm and with temperature profile as shown in table 1. Some granulate was ground to powder, soxhlet extracted with acetone and dried at 170° C. for 1 hour under vacuum for FTIR analysis. MFI and GPC was done on unpurified samples. The details of the formulations, the temperature profile and the results are shown in Table 6.

CE11

CE10 was repeated but 20 grams of MAH (2 wt %, 0.2 mol) was used instead of 10 grams.

CE12

CE10 was repeated but 40 grams of MAH (4 wt %, 0.4 mol) was used instead of 10 grams.

CE13

CE10 was repeated but the temperature profile 220 as shown in Table 1 was used instead of temperature profile 190.

CE14

CE11 was repeated but the temperature profile 220 as shown in Table 1 was used instead of temperature profile 190.

CE15

CE12 was repeated but the temperature profile 220 as shown in Table 1 was used instead of temperature profile 190.

TABLE 6

| | CE10-CE15 | | | | | | | | | |
|---|---|---|---|---|---|---|---|---|---|---|
| MAH | MAH conc. [wt %] | MAH eq. [wt %] | Temp [° C.] | grafted MAH [wt %] | Grafting yield [%] | MFI [cc/10 min] | Increase MFI [%] | Mn [g/mol] | Mw [g/mol] | Retention Mn [%] | Retention Mw [%] |
| PP | | | | | | 5.6 | | 78495 | 302749 | | |
| CE10 | 1.0 | 1.0 | 190 | 0.20 | 20 | 10.5 | 188 | 54364 | 275741 | 69 | 91 |
| CE11 | 2.0 | 2.0 | 190 | 0.68 | 34 | 10.9 | 194 | 58158 | 274777 | 74 | 91 |
| CE12 | 4.0 | 4.0 | 190 | 0.59 | 15 | 10.3 | 183 | 56711 | 277580 | 72 | 92 |
| CE13 | 1.0 | 1.0 | 220 | 0.25 | 25 | 12.6 | 225 | 56840 | 273073 | 72 | 90 |
| CE14 | 2.0 | 2.0 | 220 | 0.31 | 16 | 10.7 | 191 | 59462 | 279661 | 76 | 92 |
| CE15 | 4.0 | 4.0 | 220 | 0.64 | 16 | 10.9 | 194 | 56836 | 273789 | 72 | 90 |

Examples MAHEFYP: EX4 to EX9

EX4

CE10 was repeated using 27.15 grams of MAHEFYP (2.7 wt %, 0.1 mol) instead of 10 grams of MAH. The formulations and temperature profiles shown in Table 7. The results are also shown in Table 7.

EX5

CE10 was repeated using 54.3 grams of MAHEFYP (5.4 wt %, 0.2 mol) instead of 10 grams of MAH.

EX6

CE10 was repeated using 108.6 grams of MAHEFYP (10.9 wt %, 0.4 mol) instead of 10 grams of MAH.

EX7

EX4 was repeated but the temperature profile 220 as shown in Table 1 was used instead of temperature profile 190.

EX8

EX5 was repeated but the temperature profile 220 as shown in Table 1 was used instead of temperature profile 190.

EX9

EX6 was repeated but the temperature profile 220 as shown in Table 1 was used instead of temperature profile 190.

Examples 5-Norbornene-2,3-dicarboxylic anhydride (MAHCP): CE15 to CE20

CE15

CE10 was repeated using 16.7 grams of MAHCP (1.7 wt %, 0.1 mol) instead of 10 grams of MAH. The formulations and temperature profiles shown in Table 7. The results are also shown in Table 8.

CE16

CE10 was repeated using 33.5 grams of MAHEFYP (3.4 wt %, 0.2 mol) instead of 10 grams of MAH.

CE17

CE10 was repeated using 67.0 grams of MAHEFYP (6.7 wt %, 0.4 mol) instead of 10 grams of MAH.

CE18

CE15 was repeated but the temperature profile 220 as shown in Table 1 was used instead of temperature profile 190.

CE19

CE16 was repeated but the temperature profile 220 as shown in Table 1 was used instead of temperature profile 190.

CE20

CE17 was repeated but the temperature profile 220 as shown in Table 1 was used instead of temperature profile 190.

TABLE 7

| | EX7-EX12 | | | | | | | | | | |
|---|---|---|---|---|---|---|---|---|---|---|---|
| MAH-EFYP | MAH-EFYP conc. [wt %] | MAH eq. [wt %] | Temp [° C.] | Grafted MAH [wt %] | Grafting yield [%] | MFI [cc/10 min] | Increase MFI [%] | Mn [g/mol] | Mw [g/mol] | Retention Mn [%] | Retention Mw [%] |
| PP | | | | | | 5.6 | | 78495 | 302749 | | |
| EX4 | 2.7 | 1.0 | 190 | 0.77 | 77 | 8.2 | 146 | 58088 | 286803 | 74 | 95 |
| EX5 | 5.4 | 2.0 | 190 | 1.26 | 63 | 7.3 | 131 | 52393 | 284745 | 67 | 94 |
| EX6 | 10.9 | 4.0 | 190 | 0.98 | 25 | 8.6 | 154 | 61109 | 278860 | 78 | 92 |
| EX7 | 2.7 | 1.0 | 220 | 0.70 | 70 | 7.6 | 135 | 57157 | 281580 | 73 | 93 |
| EX8 | 5.4 | 2.0 | 220 | 1.25 | 63 | 8.1 | 145 | 59089 | 282474 | 75 | 93 |
| EX9 | 10.9 | 4.0 | 220 | 2.49 | 62 | 9.0 | 161 | 58869 | 280051 | 75 | 93 |

TABLE 8

CE15-CE20

| MAH-CP | MAH-CP conc. [wt %] | MAH eq. [wt %] | Temp [° C.] | grafted MAH [wt %] | Grafting yield [%] | MFI [cc/10 min] | Increase MFI [%] | Mn [g/mol] | Mw [g/mol] | Retention Mn [%] | Retention Mw [%] |
|---|---|---|---|---|---|---|---|---|---|---|---|
| PP |  |  |  |  |  | 5.6 |  | 52435 | 316852 |  |  |
| CE15 | 1.7 | 1.0 | 190 | 0.29 | 29 | 8.0 | 143 | 50976 | 301052 | 97 | 95 |
| CE16 | 3.4 | 2.0 | 190 | 0.27 | 14 | 8.4 | 150 | 48608 | 296486 | 93 | 94 |
| CE17 | 6.7 | 4.0 | 190 | 0.28 | 7 | 9.4 | 167 | 49665 | 311334 | 95 | 98 |
| CE18 | 1.7 | 1.0 | 220 | 0.31 | 31 | 8.7 | 156 | 47897 | 303496 | 91 | 96 |
| CE19 | 3.4 | 2.0 | 220 | 0.27 | 14 | 8.2 | 147 | 48701 | 307259 | 93 | 97 |
| CE20 | 6.7 | 4.0 | 220 | 0.34 | 9 | 8.6 | 154 | 49602 | 312710 | 95 | 99 |

The results of Tables 6, 7 and 8 are compared in FIGS. 4 to 7.

Figure 4:
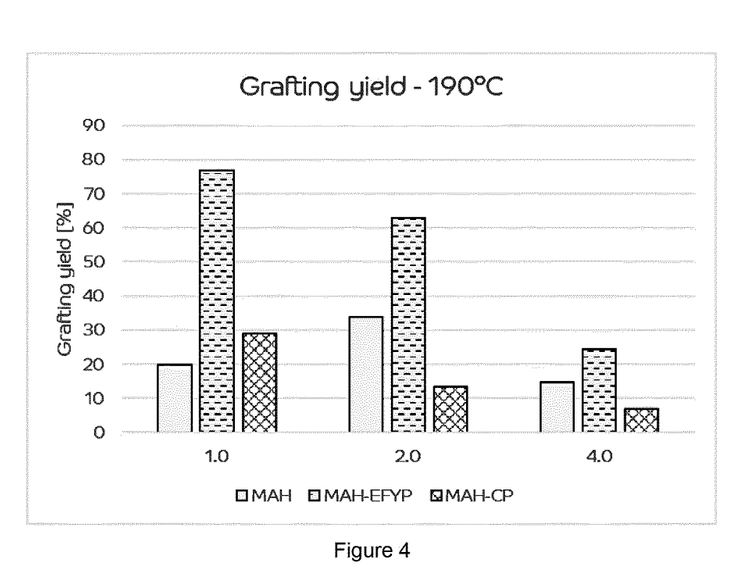
FIG. 4 illustrates the grafting yield of MAH, MAHEFYP and MAHCP grafted onto PP in a continuous reactive extrusion process at temperature profile at 190° C.
Figure 5:
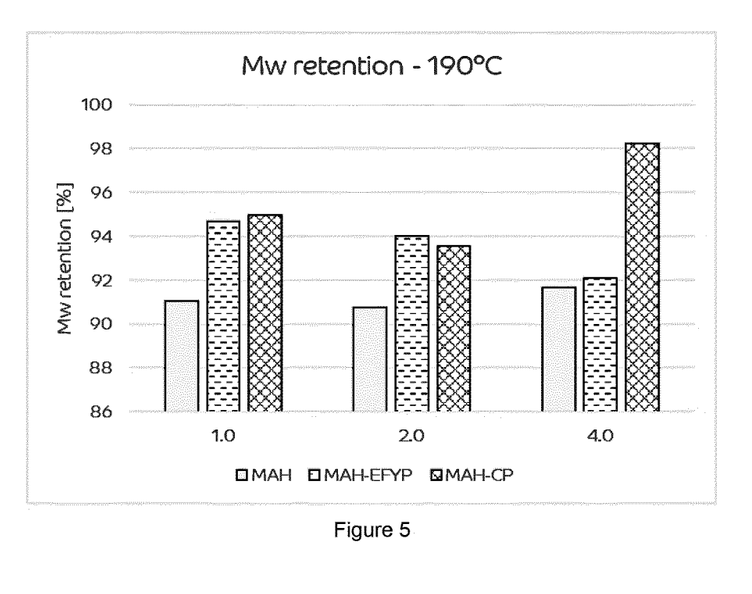
FIG. 5 illustrates the retention of weight average molecular weight (Mw) of PP grafted with MAH, MAHEFYP and MAHCP in a continuous reactive extrusion process at temperature profile at 190° C.

At 190° C. extrusion profile it can clearly be seen from FIG. 4 that the grafting yields of MAHEFYP are higher than those of MAH pure and MAHCP, over the whole concentration range measured. Molecular weight retention (Mw, FIG. 5) is best for both DA adducts, MAHEFYP and MAHCP.

Figure 6:
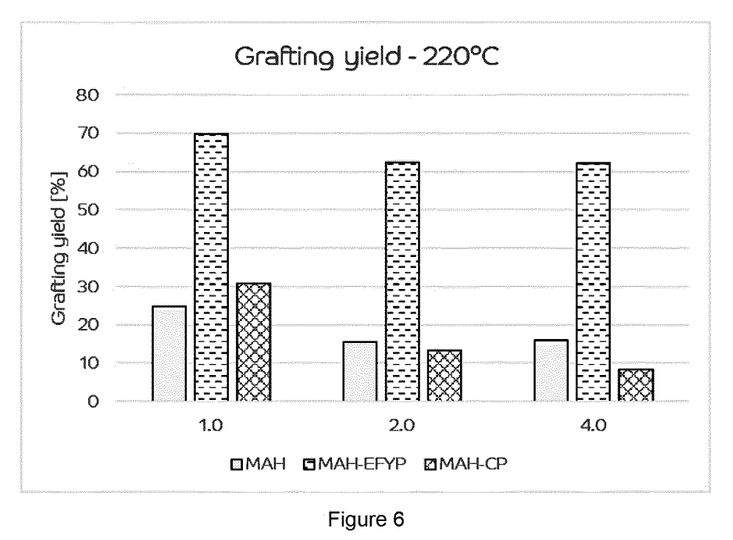
FIG. 6 illustrates the grafting yield of MAH, MAHEFYP and MAHCP grafted onto PP in a continuous reactive extrusion process at temperature profile at 220° C.
Figure 7:
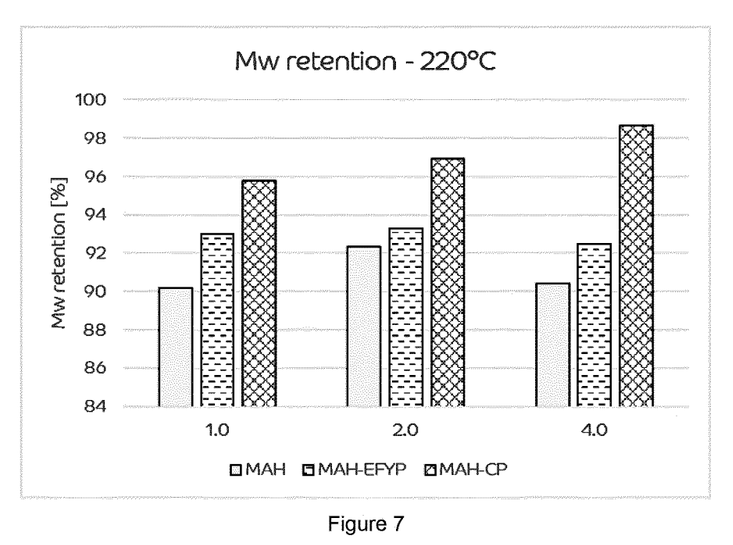
FIG. 7 illustrates the retention of weight average molecular weight (Mw) of PP grafted with MAH, MAHEFYP and MAHCP in a continuous reactive extrusion process at temperature profile at 220° C.

At 220° C. extrusion profile the same conclusions can be drawn: grafting yields of MAHEFYP are higher than those of the other two as can be seen in FIG. 6 and Mw retention is best for both DA adducts.

MFI measurements show that MFI was increased for all examples. Grafting pure MAH the final MFI results were all higher than 10 gr/10 min, whereas the MFI's of grafted DA adducts were all below 10 gr/10 min.

Result on Continuous Process

In the continuous extrusion process to graft PP with MAH the following general conclusions can be drawn:

Using Diels Alder adducts of MAH resulted in less chain degradation than using MAH.

Using MAHEFYP resulted in higher grafting levels.

Grafting MAHEFYP resulted in the best combination of high grafting efficiency and low chain degradation.

General Results

IR Spectroscopy of the Carbonyl Region of Grafted PP: CE2, EX2, CE9 and EX7

Figure 2:
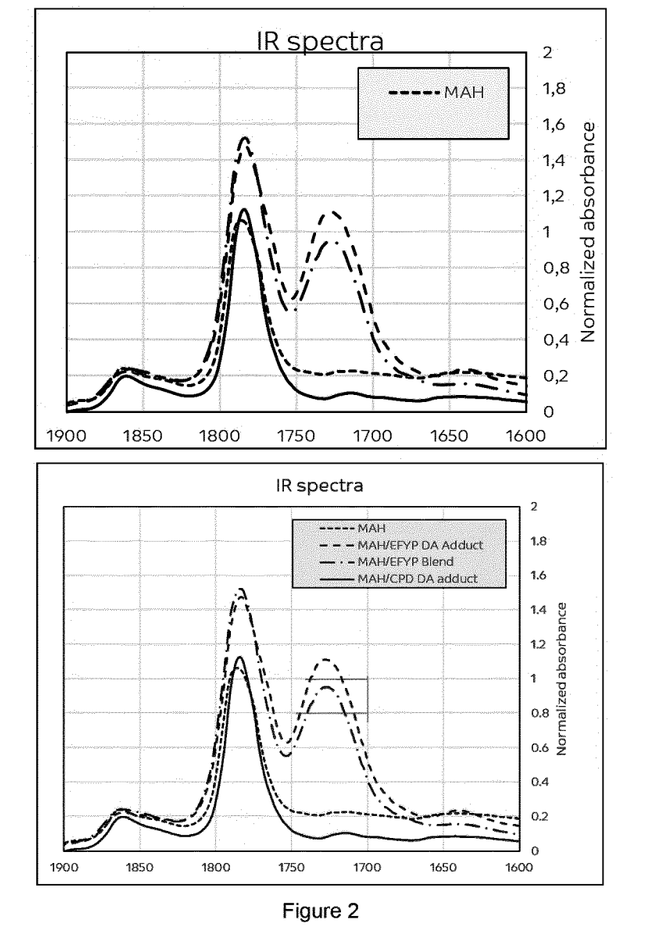
FIG. 2 illustrates FTIR spectrum of the carbonyl region of grafted PP. The spectra are zero'ed at 1900 cm$^{-1}$ and normalized to 1 at 2720 cm$^{-1}$

The IR spectrum of the sample CE2 grafted with pure MAH shows two major absorptions at 1784 and 1882 $cm^{-1}$ in the carbonyl absorption region ranging from 1900 $cm^{-1}$-1600 $cm^{-1}$ IR spectrum of samples EX2 and CE9 show an extra absorption at 1726 $cm^{-1}$, see FIG. 2. This is a typical ester absorption and indicates that EFYP is also grafted. This was not expected. The DA adduct is reversible at 100° C. and should be in the free MAH+EFYP form at grafting conditions, just as the MAH+EFYP blend.

In addition, the prior art teaches the opposite. Indeed, Passaglia (Passaglia et al Polym. Int.: 63, (2014), 12-21) describes grafting of furan derivatives with an usaturated bond in between the furan ring and an electron withdrawing group. This electron withdrawing group enhances the double bonds reactivity towards a polymer bound radical and therefore makes grafting possible. However, the current invention used EFYP which has a saturated bond in this location and it is surprising that it is able to graft onto PP.

It can be observed that using Diels Alder adducts of MAH resulted in less chain degradation than using MAH alone for all kind of process used.

Using MAHEFYP DA adduct resulted in higher grafting levels and overall, it resulted in the best combination of high grafting efficiency and low chain degradation.

The difference between the continuous process and batch process, regarding in particular the MW retention, is due to the nature of the peroxide used. In the continuous process, the peroxide used was dilauroyl peroxide which is more reactive compared to the peroxide used in the batch process (DCP). A much reactive peroxide has been used in the continuous process in order to adapt to the short resident time within the extruder. However, as radical grafting with peroxides is a very fast reaction, if a comparable residence time and the same peroxides were used in both process, the retention % should be similar.

Chain scission of PP that occurs during grafting of MAH in a radical initiated melt process can be reduced by using Diels Alder adducts of MAH. Using MAHEFYP also leads to higher grafting yields.

This was shown by two different melt processes: a batch melt-kneading process and a continuous extrusion process. The trends observed in both processes are the same and described above, the differences can be attributed to the different reaction conditions used (blending of reactants, peroxides and residence time).

Mechanical Property Examples

Mechanical Comparative Example: MCE1

PP powder, Irgafos 168 and Irganox 1010 were weighed into a polythene bag, using a digital weighing balance. All the ingredients were thoroughly mixed in the bag. The mixed formulation was then fed by means of a loss and weight feeder, together with granulated iPP (Sabic PP595P, MVR 56 cc/10 min) from another loss and weight feeder to an intermeshing, twin screw extruder of Coperion make (Model ZSK-25), a 25 mm twin screw extruder with an L/D of 40.

Figure 8:
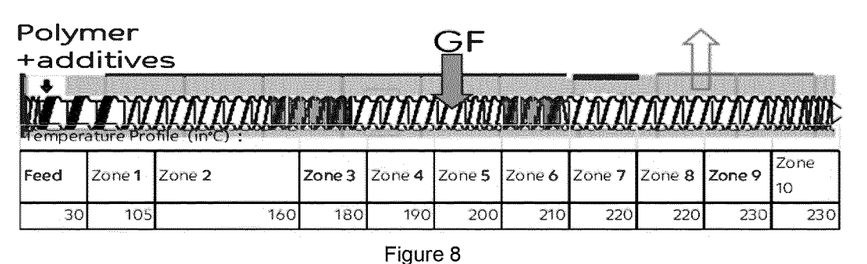
FIG. 8 illustrated the screw and temperature configuration in the continuous process used in mechanical examples

The screw set up and temperature profile are shown in FIG. 8, screw speed was maintained at 300 rpm and throughput at 10.3 kg/h. Glassfiber (GF-DS2200-13P: 13 micron diameter; 4 mm length) was fed into barrel 6.

The strands were cooled in a water bath and granulated. The formulation is shown in Table 9.

Mechanical Example: MEX1

MCE1 was repeated with the exception that 1.6 wt % of grafted PP from EX4 was added to the powder mixture. The formulation is shown in Table 9.

Mechanical Analysis

The resulting granulates from MCE1 and MEX1 were molded into tensile bars following the norm ISO 527 and Flexural bars following the norm ISO 180.

Tensile and Flexural properties were determined according to these test norms and the results are shown in the under Table 7

TABLE 9

|  |  | MCE1 | MEX1 |
|---|---|---|---|
| PP595A | kg | 5.98 | 5.82 |
| PP powder | kg | 1.00 | 1.00 |
| Glass fiber | kg | 3.00 | 3.00 |
| Grafted PP | kg | 0.00 | 0.16 |
| Irgafos 168 | kg | 0.01 | 0.01 |
| Irganox 1010 | kg | 0.01 | 0.01 |
| Total weight | kg | 10 | 10 |
| Ash content | wt % | 32.5 | 30.6 |
| Tensile modulus | Gpa | 6.94 | 6.91 |
| Tensile strength | Mpa | 66.6 | 79.1 |
| Flexural modulus | Gpa | 5.87 | 5.67 |
| Flexural strength | Mpa | 97.8 | 118.8 |

The results shown in Table 5 show that adding PP with grafted EFYPMAH is increasing tensile strength and flexural strength whereas it has negligible effect on the moduli.

The invention claimed is:

1. A polar group-containing polypropylene having:

MFI less than 10 grafted polar group content between 0.3 and 5 wt % wherein the polar group is a maleic acid derivative;

and wherein the polar group-containing polypropylene comprises at least a constituent unit represented by the following formula (1), (1)

a constituent unit represented by the following formula (2)

(2)

and optionally a constituent unit represented by the following formula (3)

(3)

in which X is $CH_2$, O, S, or NH, when X is $CH_2$, R is a saturated aliphatic group with $C_1$ to $C_{15}$ which may include functional groups selected from alcohols, thiols, ketones, aldehydes, ethers, carboxylic acids, carboxylic acid anhydrides, esters, amines, or amides or R is an aromatic moiety with $C_5$ to $C_{15}$ which may include functional groups selected from alcohols, thiols, ketones, aldehydes, ethers, carboxylic acids, carboxylic acid anhydrides, esters, amines, or amides, when X is O, S or NH, R is hydrogen or a saturated aliphatic group with $C_1$ to $C_{15}$ which may include functional groups selected from alcohols, thiols, ketones, aldehydes, ethers, carboxylic acids, carboxylic acid anhydrides, esters, amines, or amides or R is an aromatic moiety with $C_5$ to $C_{15}$ which may include functional groups selected from alcohols, thiols, ketones, aldehydes, ethers, carboxylic acids, carboxylic acid anhydrides, esters, amines, or amides, R' is hydrogen or a saturated aliphatic group with $C_1$ to $C_{15}$ which may include functional groups selected from alcohols, thiols, ketones, aldehydes, ethers, carboxylic acids, carboxylic acid anhydrides, esters, amines, or amides, or an aromatic moiety with $C_5$ to $C_{15}$ which may include functional groups selected from alcohols, thiols, ketones, aldehydes, ethers, carboxylic acids, carboxylic acid anhydrides, esters, amines, or amides, Y is O, S, or NR" when R" is hydrogen, a saturated aliphatic group with $C_1$ to $C_{15}$ which may include functional groups selected from alcohols, thiols, ketones, aldehydes, ethers, carboxylic acids, carboxylic acid anhydrides, esters, amines, or amides or R" is hydrogen, an aromatic moiety with $C_5$ to $C_{15}$ which may include functional groups selected from alcohols, thiols, ketones, aldehydes, ethers, carboxylic acids, carboxylic acid anhydrides, esters, amines, or amides.

2. A polar group-containing polypropylene according to claim 1, wherein Y and X are O and R' is hydrogen and R is —$CH_2COOR'''$ wherein R''' is alkyl from $C_1$ to $C_{13}$, which may include functional groups selected from alcohols, thiols, ketones, aldehydes, ethers, carboxylic acids, carboxylic acid anhydrides, esters, amines, or amides, or an aromatic moiety with $C_5$ to $C_{15}$ which may include functional groups selected from alcohols, thiols, ketones, aldehydes, ethers, carboxylic acids, carboxylic acid anhydrides, esters, amines, or amides.

3. A process for preparing polar group-containing polypropylene wherein the polar group is a maleic acid derivative grafted by reactive extrusion, in presence of a radical forming grafting agent, in which a polypropylene co- and/or homopolymer is put in contact with a Diels-Alder adduct which is the reaction product of a diene and a dienophile belonging to the group of maleic acid derivatives: maleic anhydrides, maleic imides or maleic thioanhydrides according to the Formula (4)

wherein
Y is O, S, or NR" when R" is hydrogen, a saturated aliphatic group with $C_1$ to $C_{15}$ which may include functional groups selected from alcohols, thiols, ketones, aldehydes, ethers, carboxylic acids, carboxylic acid anhydrides, esters, amines, or amides or R" is hydrogen, an aromatic moiety with Cs to $C_{15}$ which may include functional groups selected from alcohols, thiols, ketones, aldehydes, ethers, carboxylic acids, carboxylic acid anhydrides, esters, amines, or amides;

X is $CH_2$, O, S, or NH;

when X is $CH_2$, R is a saturated aliphatic group with $C_1$ to $C_{15}$ which may include functional groups selected from alcohols, thiols, ketones, aldehydes, ethers, carboxylic acids, carboxylic acid anhydrides, esters, amines, or amides or R is an aromatic moiety with $C_5$ to $C_{15}$ which may include functional groups selected from alcohols, thiols, ketones, aldehydes, ethers, carboxylic acids, carboxylic acid anhydrides, esters, amines, or amides;

when X is O, S or NH, R is hydrogen or a saturated aliphatic group with $C_1$ to $C_{15}$ which may include functional groups selected from alcohols, thiols, ketones, aldehydes, ethers, carboxylic acids, carboxylic acid anhydrides, esters, amines, or amides or R is an aromatic moiety with $C_5$ to $C_{15}$ which may include functional groups selected from alcohols, thiols, ketones, aldehydes, ethers, carboxylic acids, carboxylic acid anhydrides, esters, amines, or amides.

4. A process according to claim 3, wherein radical forming grafting agent is an azo-compound or a peroxide, with a half-life time following the formula 3 at 175° C.:

$$\ln 2/(A^* e^{-Ea/RT}) \leq 6 \qquad \text{(Formula 3)}.$$

5. A process according to claim 3, wherein the maleic acid derivative is maleic anhydride (MAH).

6. A process according to claim 3, wherein the Diels-Alder adduct is ethyl-3-(1,3-Dioxo-3,3a, 7,7a-tetrahydro,4, 7-epoxyisobenzofuran-4 (1H)-yl) proponoate or 5-Norbornene-2,3-dicarboxylic anhydride.

7. A process according to claim 3, wherein the maleic acid derivative concentration equivalent is between 0.3 to 10 wt %.

8. A process according to claim 3, wherein it is perform under continuous process.

9. A thermoplastic resin composition containing the polar group-containing olefin polypropylene of claim 1.

10. An adhesive resin comprising the polar group-containing olefin polypropylene of claim 1.

11. A compatibilizing agent or its precursor comprising the polar group-containing olefin polypropylene of claim 1.

12. A resin modifier comprising the polar group-containing olefin polypropylene of claim 1.

13. A filler dispersant comprising the polar group-containing olefin polypropylene of claim 1.

14. A film or a sheet comprising the polar group-containing olefin polypropylene of claim 1.

* * * * *